Nov. 13, 1945.        G. C. BONNELL        2,388,820
RELIEF VALVE FOR POWER TRANSMISSION
Filed April 25, 1942
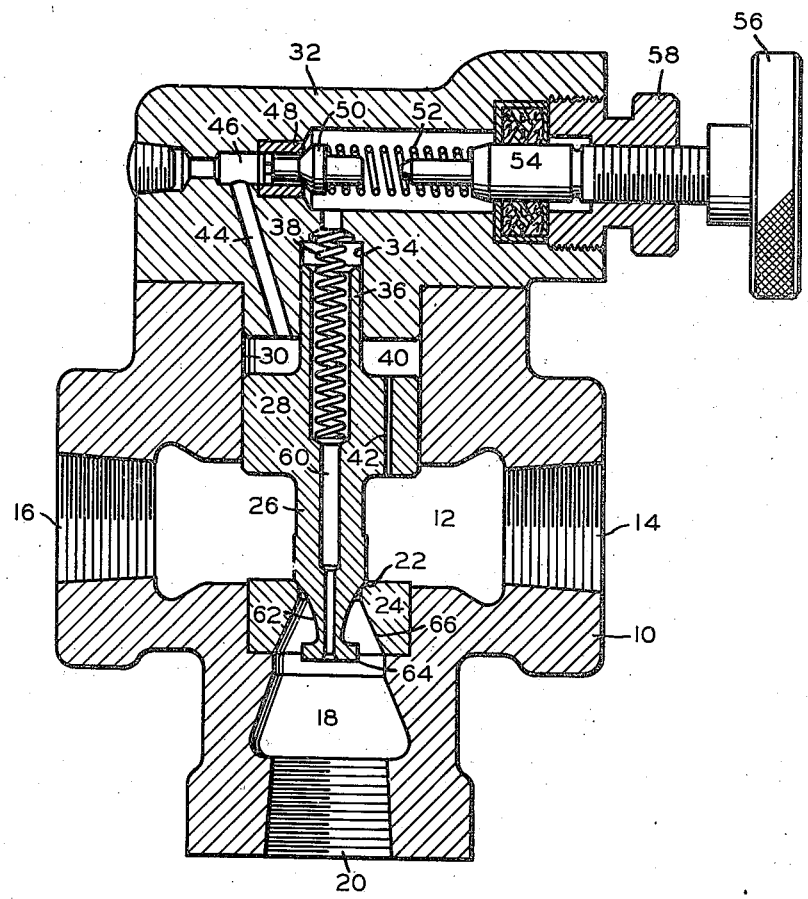
INVENTOR
GEORGE C. BONNELL
BY
*Ralph L. Tweedale*
ATTORNEY Patented Nov. 13, 1945

2,388,820

UNITED STATES PATENT OFFICE 2,388,820

RELIEF VALVE FOR POWER TRANSMISSION

George C. Bonnell, Detroit, Mich., assignor to Vickers Incorporated, Detroit, Mich., a corporation of Michigan Application April 25, 1942, Serial No. 440,475

2 Claims. (Cl. 137—53)

This invention relates to power transmissions, particularly to those of the type comprising two or more fluid pressure energy translating devices, one of which may function as a pump and another as a fluid motor.

The invention is more particularly concerned with a pressure controlling valve for use in such systems and is in the nature of an improvement upon the valve disclosed in the patent to Harry F. Vickers 2,043,453. Valves of this character have been widely used in the past with eminent success under a wide variety of operating conditions.

Some difficulties have been encountered with such valves, however, under certain conditions in very high pressure service which it is an object of the present invention to overcome. One difficulty thus encountered is a sluggish response to pressure changes, particularly with regard to closing movement, which has been difficult to overcome except by the use of a much heavier main spring in the valve which is objectionable in many applications, however.

Another difficulty which has been encountered under certain conditions is the aeration or foaming of the oil leaving the valve. This phenomenon, while not thoroughly understood as to the reason for its occurrence, is particularly bothersome when it does occur. It results in minute air bubbles being suspended in the body of liquid oil which are drawn into the pump suction pipe unless special precautions are taken to prevent this possibility. The presence of air in the working circuit is, of course, to be avoided.

Another difficulty which has been encountered is an unreliable regulation of pressure when controlling large volumes of oil. This has limited the use of such valves to circuits where the maximum flow rate which the valve would ever be called upon to handle was known and was furthermore relatively low for the pipe sizes of the valve connections. Thus, where the work circuit involves a device which stores a large amount of potential energy in fluid under pressure, as, for example, an accumulator or a large hydraulic press cylinder, the previous valves have occasionally exhibited tendencies to hunt and to widen the pressure differential between opening and closing pressures.

It is an object of the present invention to provide an improved valve construction which overcomes the difficulties above enumerated and permits reliable operation at higher pressures and higher flow rates than have been heretofore possible.

Further objects and advantages of the present invention will be apparent from the following description, reference being had to the accompanying drawing wherein a preferred form of the present invention is clearly shown.

In the drawing:

The single figure is a longitudinal cross section of a balanced pressure relief valve embodying a preferred form of the present invention.

In the form of the invention selected for illustration, there is provided a body 10 having an inlet chamber 12 provided with two pipe connections 14 and 16. The body also has an exhaust chamber 18 provided with a single pipe connection 20. The chambers 12 and 18 are in communication through a seat 22 formed on a ring 24 which is mounted in the body. The seat 22 and ring 24 provide a passage between the chambers 12 and 18 which is normally closed by a valve member 26.

The valve 26 is provided with a large diameter piston portion 28 slidable in a bore 30 formed in the upper part of the body in alignment with the seat 22. The bore 30 is closed by an end cap member 32 having a small bore 34 for the reception of a pilot extension 36 formed on the valve member 26. A light spring 38 urges the valve 26 to seated position. Bore 34 may preferably be formed of the same diameter as the seat 22. In this way there is formed at the upper end of the bore 30 a control chamber 40 having the same effective area tending to seat the valve as the effective area of the lower face of piston 28 which tends to open the valve.

The control chamber 40 is in communication with the inlet chamber 12 through a restricted passage 42. The end cap 32 is provided with a passage 44 communicating with the control chamber 40 and leading to a transverse bore 46. The latter has a plug at its lefthand end which may be removed for connecting to a venting circuit, if desired. At its righthand end the bore 46 is provided with a seat 48 on which a pilot relief valve 50 is seated by means of a spring 52. The latter is adjustable by means of a screw 54 having a thumb nut 56 and gland nut 58. The pilot relief valve 50 has its discharge side in communication with the exhaust chamber 18 through the bore 34 and through a bore 60 formed in the valve member 26.

It will be seen that, so long as no oil is permitted to escape from the control chamber 40, the pressure therein will equal the pressure in inlet chamber 12, since there is no flow and consequently no pressure drop through passage 42.

Under these conditions, the piston 28 is hydraulically balanced, and the spring 38 alone maintains the valve 26 on the seat 22. Should the pressure in chambers 12 and 40 rise above the setting of pilot valve 50, the latter will open and bleed oil from control chamber 40 at a rate greater than can be replaced through the passage 42, thus reducing the pressure on the top of piston 28 and permitting valve 26 to lift off seat 22.

The lower end of the valve 26 is formed with a gradually tapering portion 62 which extends through the seat 22 and terminates in an outwardly directed skirt 64 having an outer annular flat surface on its upper face. The latter is of substantially the same diameter as the seat 22 so that it may pass therethrough, and it abruptly interrupts the inward taper of portion 62. It will be seen that, when valve 26 is open, high velocity flow occurring along the tapered portion 62 will create an upward reaction much like that on a turbine blade which will tend to further lift the valve. This reaction, however, is offset by the reaction of the high velocity jet impinging upon the upper surface of skirt 64 from which the flow rebounds to the outwardly tapering walls 66 of the passage formed through the ring 24.

The net result of this formation of the lower end of the valve is to greatly improve the operation, particularly at very high pressures and at higher rates of flow. The high velocity jet which impinges upon the skirt 64 as it leaves the smooth taper 62 completely overcomes any tendency of the valve to lift higher as the flow rate through the valve increases. In addition, any tendency of the valve to cause foaming or aeration of the oil is practically eliminated.

While the form of embodiment of the invention as herein disclosed constitutes a preferred form, it is to be understood that other forms might be adopted, all coming within the scope of the claims which follow.

What is claimed is as follows:

1. A relief valve for regulating the pressure of liquid in a power transmission system comprising a body having an inlet chamber, and an exhaust chamber, a passage forming a valve seat and connecting said chambers, and a valve member slidable in the body and positioned upon the pressure chamber side of said seat to close the passage, said valve member having a portion extending through said passage and into said exhaust chamber and tapering smoothly to a small fraction of the seat diameter, said member also having an enlarged, flat-surfaced skirt abruptly flaring outwardly at the terminus of said tapered portion and deflecting the fluid flowing along said extending portion suddenly substantially perpendicularly to its previous direction of flow, thereby causing eddy currents to offset the reaction forces set up by high velocity flow along said tapered portion and to eliminate aeration and foaming of said liquid.

2. A relief valve for regulating the pressure of liquid in a power transmission system comprising a body having an inlet chamber, and an exhaust chamber, a passage forming a valve seat and connecting said chambers, and a valve member slidable in the body and positioned upon the pressure chamber side of said seat to close the passage, said valve member having a portion extending through said passage and into said exhaust chamber and tapering smoothly to a small fraction of the seat diameter, said member also having an enlarged, flat-surfaced skirt abruptly flaring outwardly at the terminus of said tapered portion and deflecting the fluid flowing along said extending portion suddenly substantially perpendicularly to its previous direction of flow, said exhaust chamber being formed with an outwardly tapering portion extending away from said passage and providing wide clearance around said skirt, whereby to offset the reaction forces set up by high velocity flow along said tapered portion and to eliminate aeration and foaming of said liquid.

GEORGE C. BONNELL.